United States Patent [19]

Bec

[11] Patent Number: 5,455,495

[45] Date of Patent: Oct. 3, 1995

[54] CONTROL DEVICE FOR SERVOCONTROLLING AN OBJECT TO A GIVEN POSITION

[75] Inventor: Daniel Bec, Villeneuse Tolosane, France

[73] Assignee: Art Tech Gigadisc "ATG", Toulouse, France

[21] Appl. No.: 150,067

[22] PCT Filed: Mar. 23, 1993

[86] PCT No.: PCT/FR93/00289

§ 371 Date: Nov. 22, 1993

§ 102(e) Date: Nov. 22, 1993

[87] PCT Pub. No.: WO93/19408

PCT Pub. Date: Sep. 30, 1993

[30] Foreign Application Priority Data

Mar. 24, 1992 [FR] France .................................. 9203514

[51] Int. Cl.⁶ .......................... G05B 21/02; G05B 19/23
[52] U.S. Cl. .................. 318/560; 318/568.22; 318/625; 318/636
[58] Field of Search .................................. 318/560, 567, 318/568.1, 568.11, 568.16, 568.18, 568.2, 568.22, 600, 606, 619, 625, 632, 636, 638, 609, 610

[56] References Cited

U.S. PATENT DOCUMENTS

| | | |
|---|---|---|
| 3,578,957 | 5/1971 | Gatlin . |
| 4,577,271 | 3/1986 | Jones et al. . |
| 4,794,313 | 12/1988 | Ohmen . |
| 4,893,068 | 1/1990 | Evans . |
| 5,049,796 | 9/1991 | Seraji .................... 318/568.1 |
| 5,063,335 | 11/1991 | Baechtel et al. .......... 318/609 |
| 5,107,193 | 4/1992 | Iwashita ................. 318/560 |
| 5,239,248 | 8/1993 | Shimada et al. ......... 318/568.12 |

FOREIGN PATENT DOCUMENTS

| | | |
|---|---|---|
| 0362801 | 4/1990 | European Pat. Off. . |
| 3118259 | 12/1982 | Germany . |
| 3719581 | 12/1988 | Germany . |

OTHER PUBLICATIONS

Patent Abstracts Of Japan, vol. 12, No. 411 (p–779) 31 Oct. 1988, & JP, A, 63,148,309 (Yokogawa Electric Corp) 21 Jun. 1988, voir abrege.

*Primary Examiner*—Bentsu Ro
*Attorney, Agent, or Firm*—Oblon, Spivak, McClelland, Maier, & Neustadt

[57] ABSTRACT

A control device for servocontrolling an object to a given position includes a motor, a coder connected to the motor, and a rig connected to the coder and the motor, the rig including (a) a counter and a subtractor which generate a position discrepancy signal on the basis of an output of the coder and an external set-point signal input to the subcontractor; (b) circuit paths each having a sampling device which receives the position discrepancy signal and samples this signal at a distinct frequency, each circuit path performing a different degree of differentiation; (c) a summing unit for receiving and summing outputs of each of the circuit paths; and (d) an amplifier for receiving an output of the summing unit and outputting a control signal which controls the motor.

27 Claims, 11 Drawing Sheets

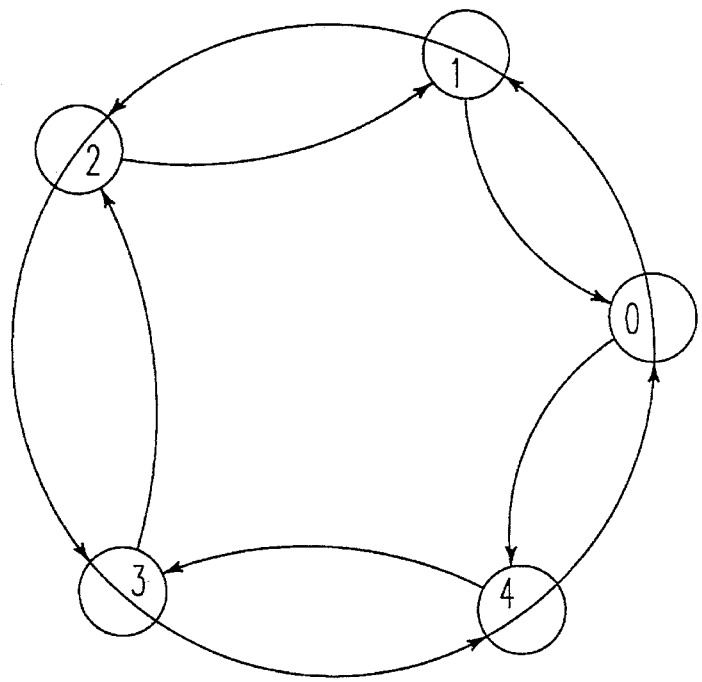
FIG. 10A(1)
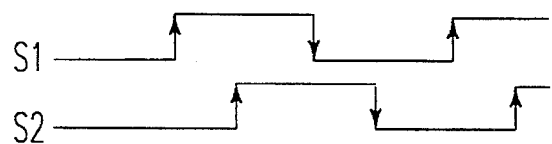
FIG. 10A(2)
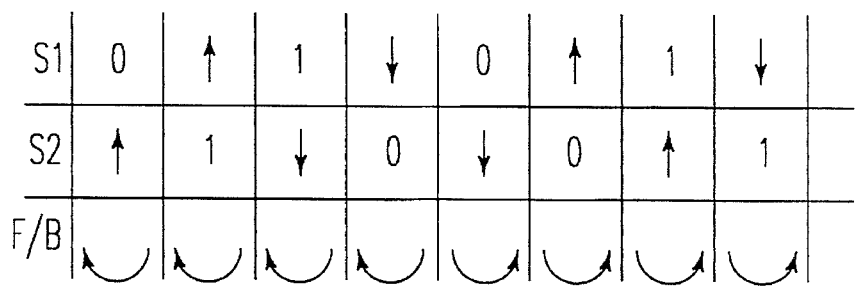
FIG. 10A(3)

FIG. 10B(1)
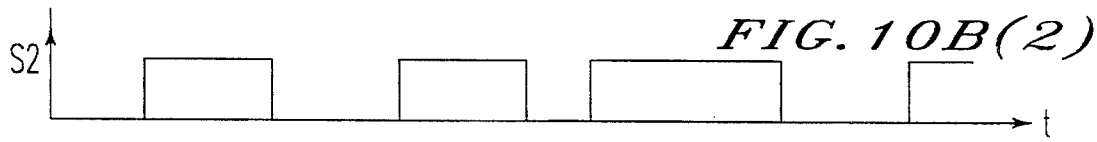
FIG. 10B(2)
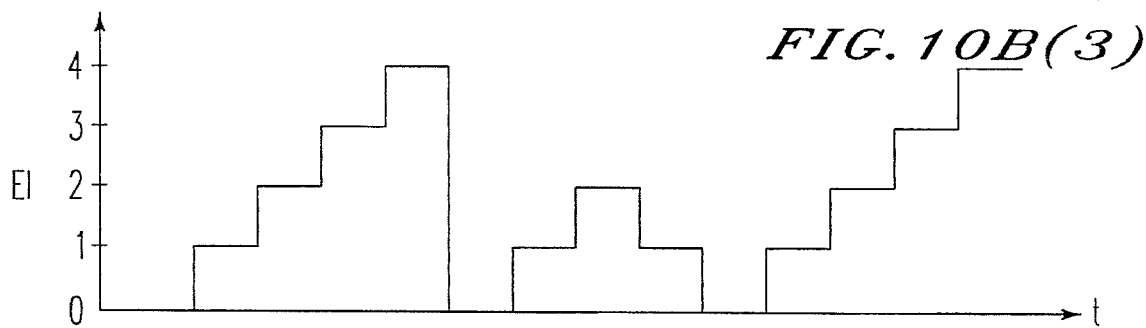
FIG. 10B(3)
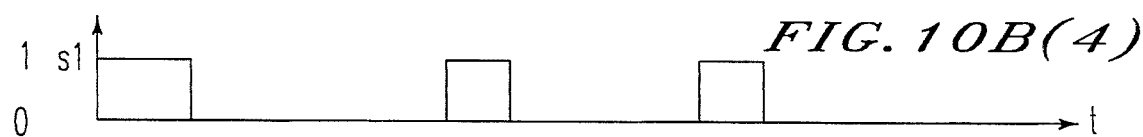
FIG. 10B(4)
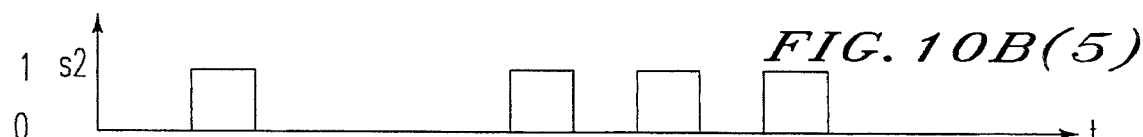
FIG. 10B(5)
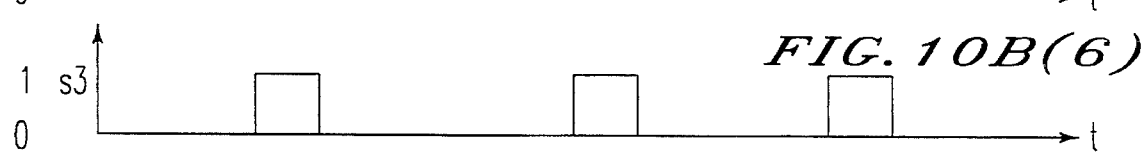
FIG. 10B(6)
FIG. 10B(7)
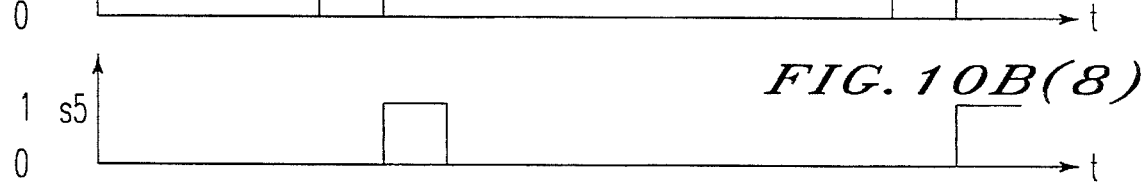
FIG. 10B(8)
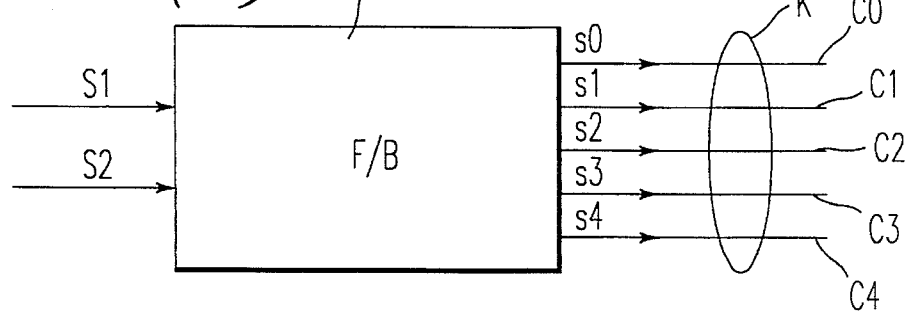
FIG. 10B(9)

CONTROL DEVICE FOR SERVOCONTROLLING AN OBJECT TO A GIVEN POSITION

BACKGROUND OF THE INVENTION

1. Field of the Invention

The present invention relates to a control device intended for servocontrolling one or more objects to given positions. These devices are generally used in robotics. They may be involved, for example, in controlling motor shafts. This is the example which will be taken into consideration in what follows. It should, however, be noted that the control device according to the invention applies to the position servocontrol of any object.

2. Description of the Related Art

A conventional device for motor shaft control comprises a servocontrol of position and a servocontrol of speed of the motor shaft.

The speed servocontrol controls the motor shaft as long as the distance separating the actual position of the said shaft from the final position which the latter is to attain is greater than a given value. When this distance attains the said value, the position servocontrol comes in.

There is therefore a switching between the two types of servocontrol. This switching has disadvantages due to the instability inherent in this transition.

The existence of these two types of servocontrol and of the transition which links them requires circuits and algorithms of great complexity, leading to computation times which are often very lengthy.

SUMMARY OF THE INVENTION

In order to eliminate these disadvantages, the Applicant has designed a device enabling the position discrepancy to be servocontrolled with a single law, thereby allowing elimination of the switching between the two types of servocontrol. Through the servocontrol a non-linear relation is imposed between the position discrepancy and the action of the motor. There is then continuity in the decision making enabling the device to attain the desired objective. Although part of the control device is hardware-based, it is essentially software-based and therefore uses a microprocessor. Whether the algorithm used be a position and speed monitoring algorithm, as in the conventional devices, or an algorithm associated with a single law as mentioned above, the devices according to the prior art process the signals received in the same way without taking their frequency into account.

The customary correcting systems use the mathematical operation commonly called the "z transform". As is known by those skilled in the art, these systems perform a sampling at one frequency. The low frequencies of the signal studied are then processed at the same rate as the high frequencies.

This results in a loss of time at microprocessor level, this preventing, as a consequence, the control of several motor shafts in parallel with the aid of the same microprocessor, unless there is a loss in response time of the control device or unless a microprocessor with very high clock frequency, which is hence expensive, is employed.

The present invention does not have this disadvantage.

The subject of this invention is a control device intended for servocontrolling an object to a given position, the device comprising a forward/backward counting device enabling an absolute address in binary code to be provided from the indication of position of the object, a microprocessor enabling a signal for correcting the position of the object to be generated with the aid of a servocontrol algorithm, the algorithm making it possible to carry out a sequence of mathematical operations from the absolute address, in particular comparison of the address with an external set-point representing the given position so as to generate a position discrepancy signal, computation of a law providing a position signal deduced from the position discrepancy, differentiation of the position discrepancy followed by multiplication of the result of the differentiation, integration of the position discrepancy, addition of the results of the operations for computing the law, for multiplication arising from the differentiation and for integration, a device consisting of a digital/analog converter and an amplifier, and a motor controlled by the amplifier, the assembly being looped in such a way that the action of the motor makes the position of the object tend to the said given position, characterized in that the differentiation operation is preceded by a sampling at a frequency F and in that the computation of the law providing the position signal deduced from the position discrepancy is preceded by a sampling at a frequency $F1=F/R$, R being an integer greater than 1. The multiplicative factor of the multiplication operation is preferably chosen equal to R; the number R is preferably chosen such that the phase advance of the signal resulting from the addition operation with respect to the signal representing the position discrepancy is substantially between 50° and 65°.

The subject of this invention is also a control device intended for servocontrolling the position of several objects, characterized in that it comprises a single microprocessor enabling a signal for correcting the position of each object to be generated with the aid of one servocontrol algorithm.

An advantage of the invention therefore lies in the fact that the activity of a microprocessor is optimized in time, thus enabling several objects to be controlled in parallel.

In what follows, the objects under consideration will be motor shafts.

BRIEF DESCRIPTION OF THE DRAWINGS

Other characteristics and advantages of the invention will emerge on reading a preferred embodiment, given with reference to the attached figures in which:

FIG. 10A represents the chart of the internal states and the change of state table of a five-state cyclic forward/backward counter;

FIG. 10B represents the input signals, the corresponding internal state and the output signals of the five-state cyclic forward/backward counter;

DESCRIPTION OF THE PREFERRED EMBODIMENTS

In all the figures, the same references designate the same elements.

As stated previously, the servocontrol device is essentially embodied with the aid of a microprocessor.

Thus, in the block diagrams of FIGS. 1A, 1B, 2, 4, 9 and 11 each of the devices situated in area 100 represents, symbolically, an elementary mathematical operation of the servocontrol algorithm.

Figure 1A:
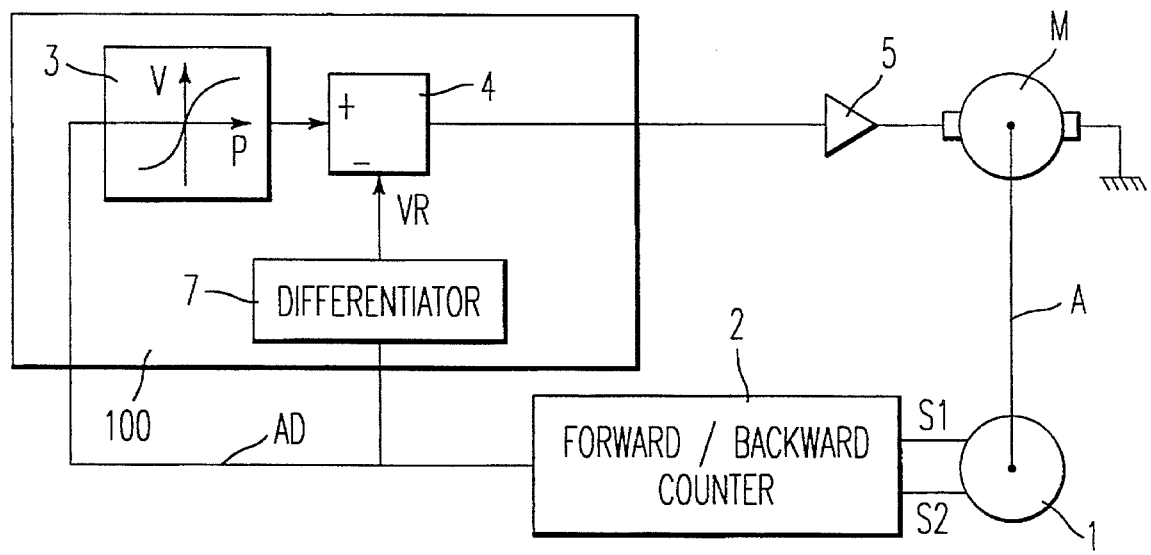
FIGS. 1A and 1B represent respectively the block diagram of the speed servocontrol and the block diagram of the position servocontrol of a conventional device according to the prior art.

FIG. 1A describes the schematics of the speed servocontrol of a conventional device according to the prior art. A coder 1 captures the position of the motor shaft A of the motor M. Generally, this coder is a nonabsolute coder which delivers two signals S1 and S2 in quadrature. Absolute coders, which provide an absolute address, are not generally used since they are much too expensive.

From the indication provided by the signals S1 and S2, the forward/backward counter 2 generates, in binary code, the absolute address AD giving the position P of the controlled motor shaft. This indication is then sent to a device 3 intended for providing the speed law $V = P \times (|P|)^{-1} \times \sqrt{|P|}$ where P is the position of the motor shaft, represented by the absolute address AD.

The quantity V is then compared by way of the subtractor 4 with the actual speed VR of the motor which is output by the differentiator 7.

The signal leaving the comparator 4 is sent to the device 5 consisting of a digital/analogue converter, followed by an amplifier whose output signal controls the speed of the motor shaft.

Figure 1B:
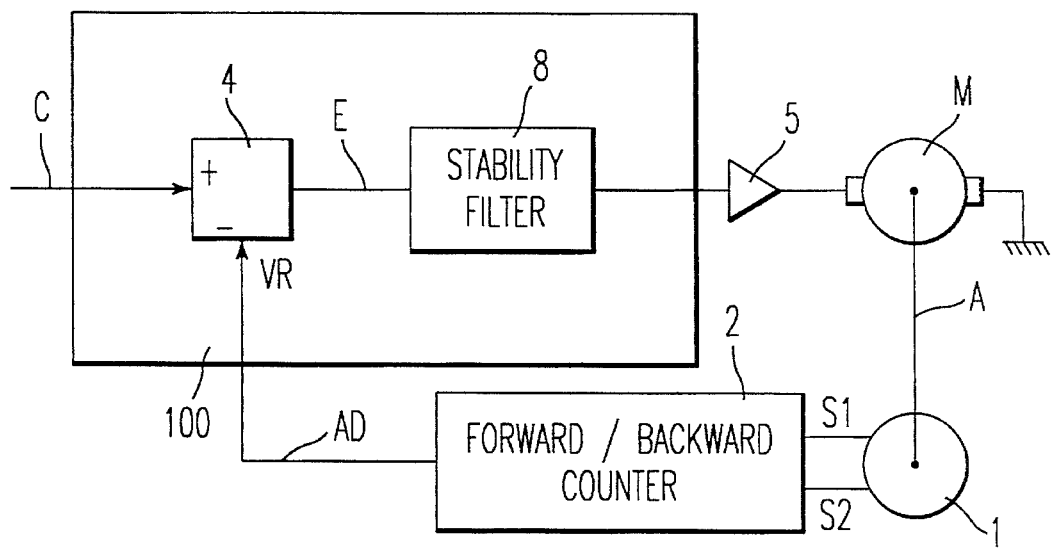

FIG. 1B describes the schematics of the position servocontrol of a conventional device according to the prior art. As mentioned above, this servocontrol comes in when the distance between the actual position of the motor shaft and the final position which the latter is to attain passes through a predetermined value.

As in the device described above, the position of the motor shaft A is captured by a coder 1. This coder provides the signals S1 and S2 as before. Similarly, the forward/backward counter 2 provides the absolute position of the motor shaft in binary code AD, the said position being compared with the position set-point C with the aid of the subtractor 4.

The position discrepancy E output by the subtractor 4 is sent to the stability filter 8.

It is known by those skilled in the art that a phase advance is required in order to stabilize the servocontrol loop. This filter provides therefor.

The device 5 powers the motor. The assembly of real or symbolic components 1, 2, 4, 8, 5 and M forms a loop such that the action of the motor tends to reduce the discrepancy E.

Figure 2:
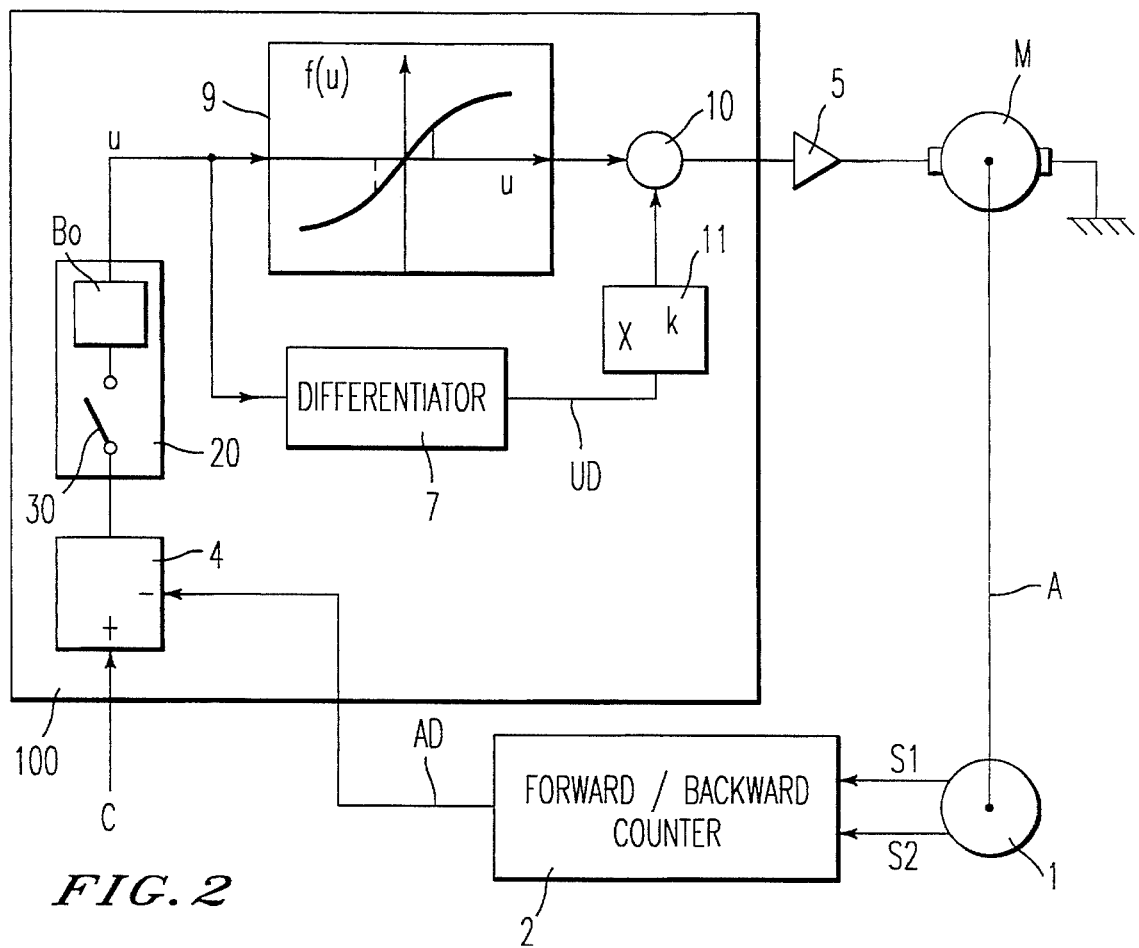
FIG. 2 represents the block diagram of the device allowing servocontrol of the position of the motor shaft with a single law.

FIG. 2 describes the block diagram of the device allowing the servocontrol of the position of the motor shaft with a single law, but accordingly to the prior art, that is to say by sampling the signal at one frequency.

A non-absolute coder 1 captures the position of the motor shaft A and delivers two signals in quadrature S1 and S2 which are sent to a forward/backward counter 2.

The absolute address AD leaving the forward/backward counter 2 and giving the position of the motor shaft is sent to a subtractor 4 which outputs the position discrepancy E between a position set-point C and the absolute address AD. This position discrepancy E is sent to a sample and hold device 20. The said sample and hold device comprises a switch 30 placed in series with an order zero holding circuit $B_0$ whose function is to maintain the value of a sampled signal until the arrival of the next sampled signal, which then replaces it. According to the prior art, the sampling is performed at one frequency denoted F. The signal U leaving the sample and hold device is next sent both to a device 9 which provides the single law f(U) and to a differentiator 7 which provides a signal equal to the derivative of U with respect to time, denoted UD.

The summing unit 10 generates the term $f(U) + k \times UD$, the multiplicative factor k being provided by the multiplier 11.

Figure 3:
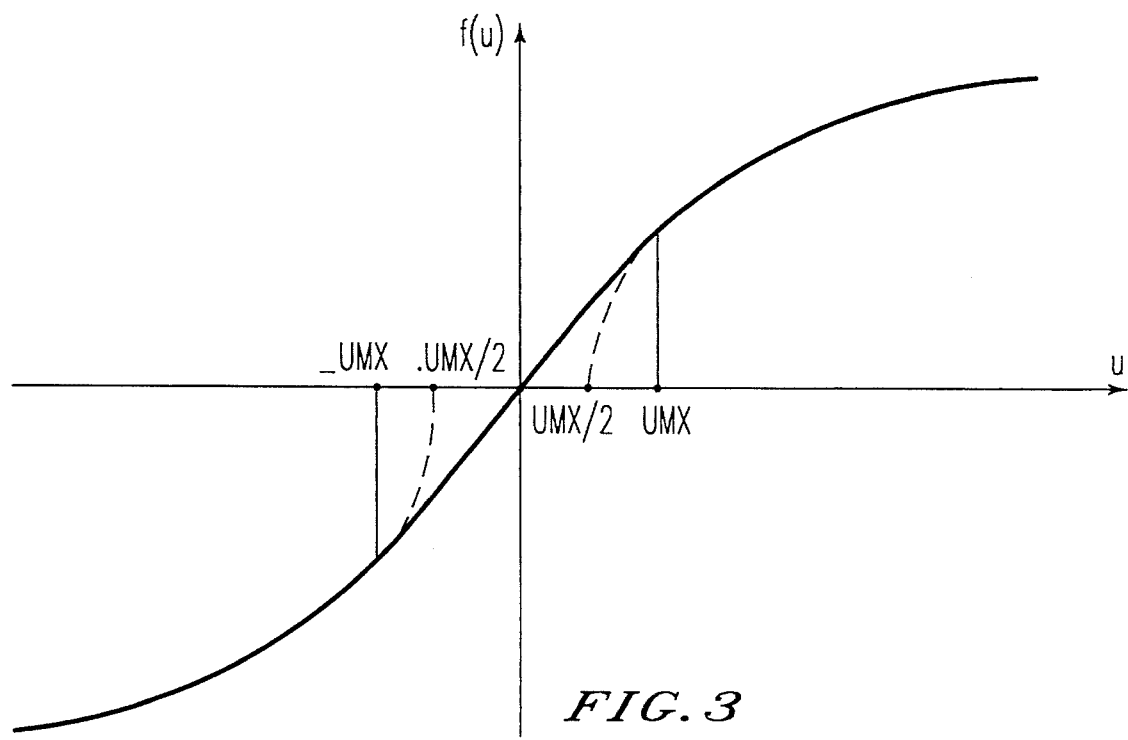
FIG. 3 represents the curve describing the single law of the device according to FIG. 2.

The law f(U) is detailed in FIG. 3.

When the absolute value of U, denoted |U|, is less than a certain amount UMX, we have:

$$f(U) = U.$$

The value of k is determined such that the position servocontrol has the best response as known by those skilled in the art. The differential equation to be solved then reduced to $U + k \times UD = 0$.

When the absolute value of U is greater than UMX, it follows that:

$$f(U) = \frac{U}{|U|} \sqrt{2UMX \times \left(U - \frac{UMX}{2}\right)} \times \frac{U}{|U|}$$

where UMX is a positive real number chosen as a function of the characteristics of the motor which produces the action and of the inertia of the driven object, including that of the motor, so as to terminate the intervention with constant deceleration in complete safety, without multiple oscillations. UMX may be chosen for example so as to terminate the intervention with a deceleration equal to two thirds of the maximum deceleration which the motor M can impart to the motor shaft A.

Thus is recovered, on the one hand, a non-linear law similar to that used for the speed in a conventional case, but here applied to the position discrepancy, when the position discrepancy is large (|U|>UMX) and, on the other hand, a law proportional to U when the position discrepancy is small (|U|<UMX).

The device 5 is the same as that described earlier with reference to FIGS. 1A and 1B.

Figure 4:
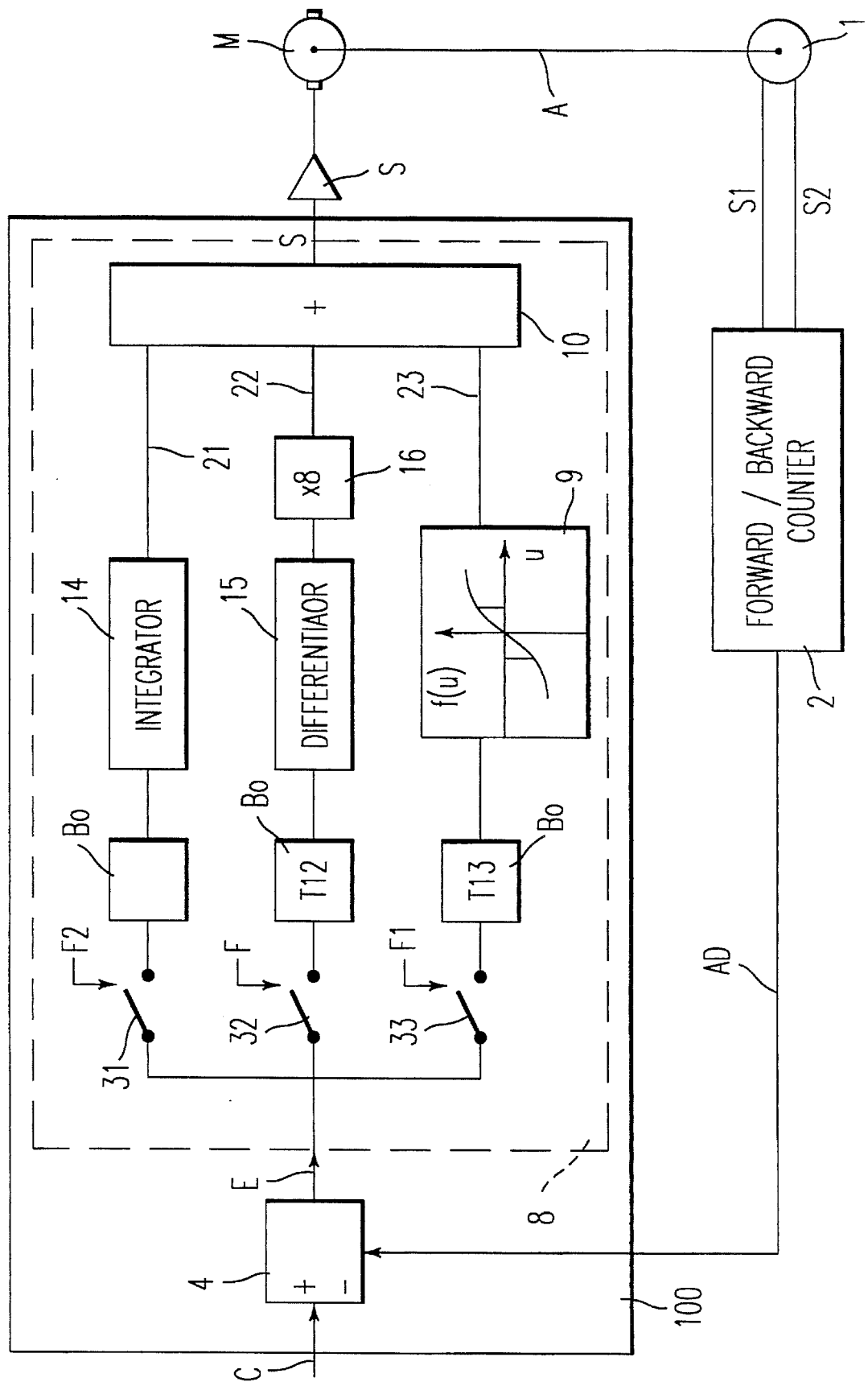
FIG. 4 represents the block diagram of a servocontrol of the position discrepancy using a single law according to the invention.

FIG. 4 represents the block diagram of a servocontrol of the position discrepancy with a single law according to the preferred embodiment of the invention.

As mentioned above, in area 100, a mathematical operation is represented symbolically by a device. According to the invention, the symbolic device representing the stability filter 8 consists of 3 branches and a summing unit 10.

One branch 23 comprises the device 9 symbolizing the single law.

One branch 22 termed the "derivative action branch" comprises the differentiator 15 which symbolizes the differentiation operation.

One branch 21 termed the "integral action branch" comprises the integrator 14 which symbolizes the integration operation.

According to the invention, the filter 8 is sampled at several frequencies.

With F being the frequency of sampling the derivative action branch 22, then, according to the preferred embodiment, F1=F/8 is the frequency of sampling the branch 23 which contains the device symbolizing the single law and F2=F/64 is the frequency of sampling the integral action branch 21.

Generally, for a frequency F of sampling the derivative action branch, the frequency of sampling the branch 23 is F1=F/R, R being an integer greater than 1. Preferably, R is chosen so that the phase advance of the stability filter is substantially between 50° and 65°. Preferably, the frequency of sampling the branch 21 is F2=F/R² but other values are possible The samplings of the branches 21, 22 and 23 are represented by the switches 31, 32 and 33 respectively.

Apart from the differentiator 15, the derivative action branch 22 comprises an order zero holding circuit Bo whose transfer function is:

$$T12 = \frac{1 - e^{-i\omega T}}{i\omega}$$

with T=1/F, ω being the pulsatance, in the Fourier analysis sense, of the signal associated with the sampled address,i being the imaginary mathematical number such that i²=−1.

This branch also contains a multiplier 16 whose multiplicative factor is, according to the preferred embodiment, equal to 8.

Similarly, apart from the symbolic device 9 for the single law, the branch 23 contains an order zero holding circuit Bo whose transfer function is, according to the preferred embodiment of the invention:

$$T13 = \frac{1 - e^{i\omega T/8}}{i\omega}.$$

In the branch 23, the device 9 for the single law describes a law f(U) identical to the single law mentioned above.

Apart from the device 9, the branch 23 also contains a filter 13 with transfer function T13.

The operation of the servocontrol loop according to the invention can be described as follows.

The position discrepancy E is obtained by comparing the set-point C with the absolute address AD output by the forward/backward counter 2.

The switch 31 of the integral action branch 21 is controlled in tempo with the sampling frequency F2 only when the speed of the motor shaft is below a given value V1. At speeds above the value V1 the old integral action is retained in memory and is updated on crossing back to speeds below the said given value. The signal for controlling the switch 31 arises from a logic function which is not represented in the figure and which compares the speed of the motor shaft with the value V1. If the speed of the motor shaft is greater than V1, the switch remains open, otherwise it is activated in tempo with the frequency F2. The indication giving the speed of the motor shaft is read off at the output of the differentiator 15 by any means known to those skilled in the art.

For large signals, such that |U|>UMX, the device operates in the same way as was seen for the speed servocontrol according to the prior art with reference to FIG. 2.

An advantage of the invention also lies in the fact that computation of the square root is performed at the frequency F1=F/8: the microprocessor is called upon eight times less frequently for this computation and is therefore available for other tasks. Since computation of the square root is a lengthy operation, another characteristic of the invention is the determination of the square root with the aid of a table of values of small size, this likewise leading to a reduction in computation time.

Indeed, any positive, real number x may be written $x = r \times 2^{2q}$, where r is a real number greater than or equal to 1 and less than 4.

It therefore follows that:

$$\sqrt{x} = \sqrt{r} \times 2^q$$

A table containing for example, 32 values of r is sufficient to allow interventions of high quality.

Multiplication by $2^q$ is, in binary, merely a shifting of the decimal point by q positions; it is therefore a fast operation.

For small signals, such that |U|<UMX, the filter 8 is linear. The three branches 21, 22 and 23 are taken into account. However, as a first approximation, it may be considered adequate to take branches 22 and 23 into account, branch 21 affording a small correction only, except at very low frequencies. The signal S recovered at the output of the adder 10 can then be written:

$$S = 8 \times \frac{(1 - e^{-i\omega T})^2}{i\omega} + \frac{1 - e^{-8i\omega T}}{i\omega}$$

According to the preferred embodiment of the invention, the frequency of sampling the branch 23 is the frequency f divided by 8. Similarly, the multiplier 16 situated in the branch 22 has a multiplicative factor equal to 8.

It is known by those skilled in the art that, in continuous mode, that is to say without sampling, this multiplicative factor is of the order of 10. Here also, the factor 10 would allow an embodiment of the invention. Generally, the value of the multiplicative factor is therefore chosen equal to R, the value of the ratio of the sampling frequencies F and F1.

Figure 5:
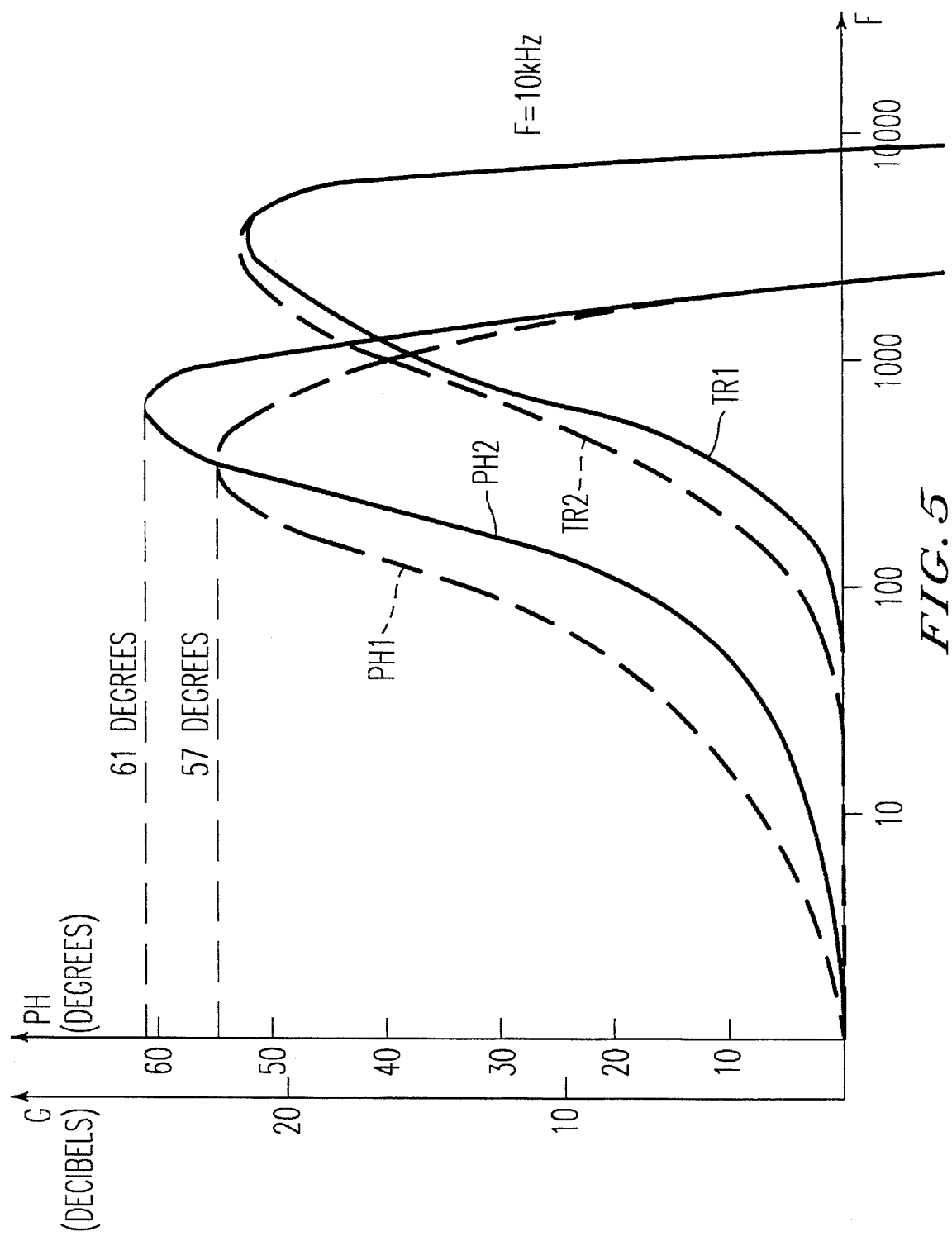
FIG. 5 represents the curves of the phase advance and gain of the compensation and stability filter of the device according to the invention described in FIG. 4 and of the device according to the prior art described in FIG. 2.

FIG. 5 represents, for small signals, |U|<UMX, the curves giving the phase advance PH and the transfer function TR of the stability filter according to the invention and according to the prior art, as a function of the frequency f of the signal entering the said filter. The solid curves (PH1, TR1) relate to the device according to the invention and the dashed curves (PH2, TR2) relate to the device according to the prior art described in FIG. 2. The sampling frequency F is identical in both cases. The value chosen is, for example, F=10 kHz in the case of a motor shaft with a cutoff frequency of the order of 500 to 1000 Hz. Any other compatible value of the signals studied leads to qualitatively identical results.

It is observed that the curves of gain TR1 and TR2 are substantially identical. Thus, the phase advance attains the value 61 degrees according to the invention, whilst it attains 57 degrees according to the prior art.

Figure 6:
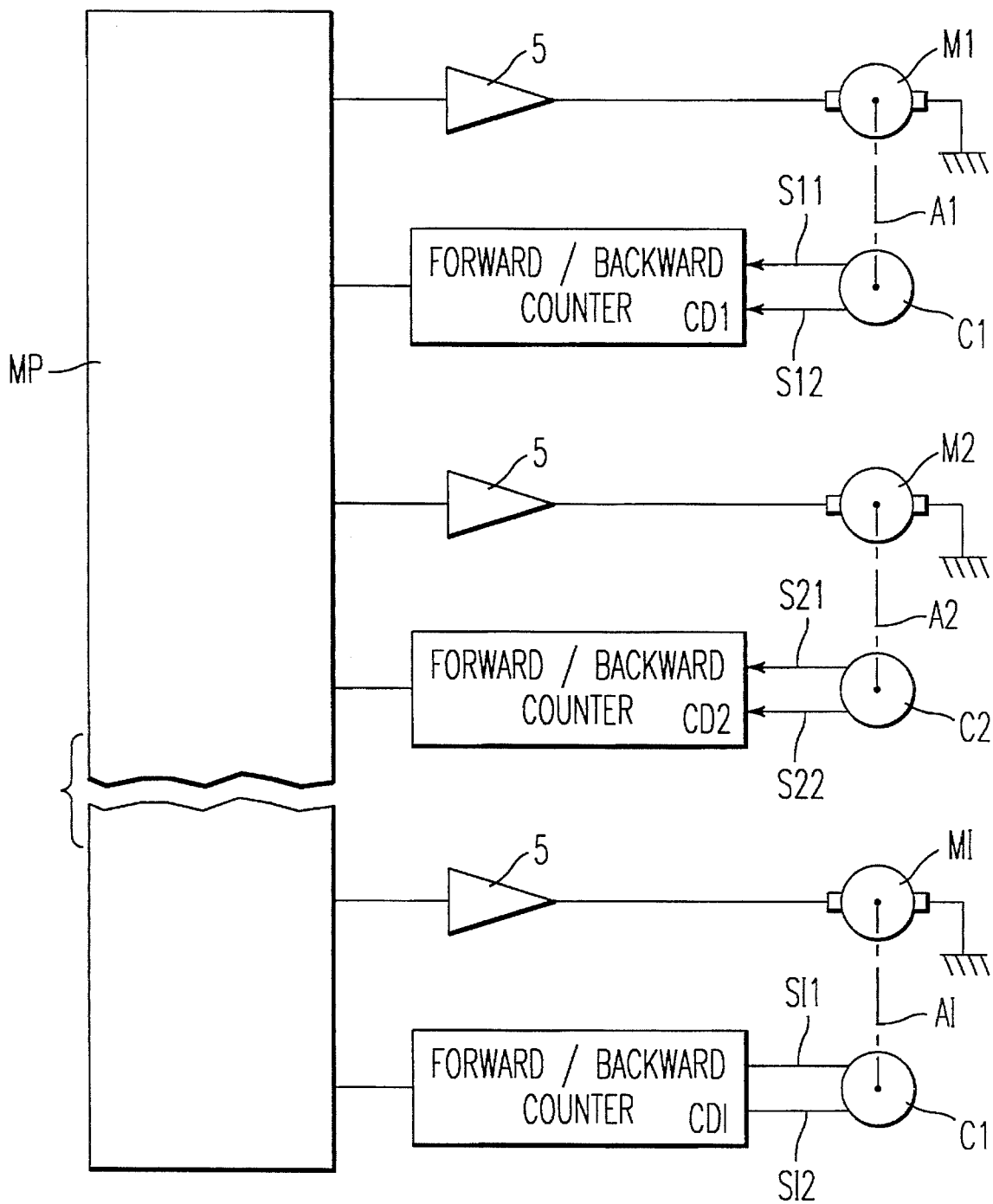
FIG. 6 represents an illustrative embodiment of the invention.

FIG. 6 represents an illustrative embodiment of the invention.

A single microprocessor MP controls, in parallel, I motors Mi (i=1, 2, ..., I), with respective motor shafts Ai (i=1, 2 ..., I). By virtue of the time saving obtained through sampling and through computation of the single law according to the invention, the same microprocessor allows the servocontrol of the position of several motor shafts.

The indication regarding the position of the motor shaft Ai is provided by the non-absolute coder Ci (i=1, 2, ..., I) which provides the two signal in quadrature Si1 and Si2 (i=1, 2, ..., I).

The said two signals are then sent to a forward/backward counter CDi (i=1, 2, ..., I) whose function is to provide, in binary code, the absolute address giving the position of the motor shaft.

In the devices described in FIGS. 4 and 6 the forward/backward counters may be chosen from those known to those skilled in the art. Each forward/backward counter then consists of a first subassembly of circuits enabling the position of the motor shaft to be obtained in binary code and of a second sub-assembly of circuit, for output register, controlled in synchronism with the signals S1 and S2. The absolute address bits leaving the forward/backward counter are then sent to the microprocessor MP.

The forward/backward counter device may also be a device according to the invention of the patent application entitled "Forward/backward counting device", filed in France in the name of the ART TECH GIGADISC Company on 10 Mar. 1992.

Figure 7:
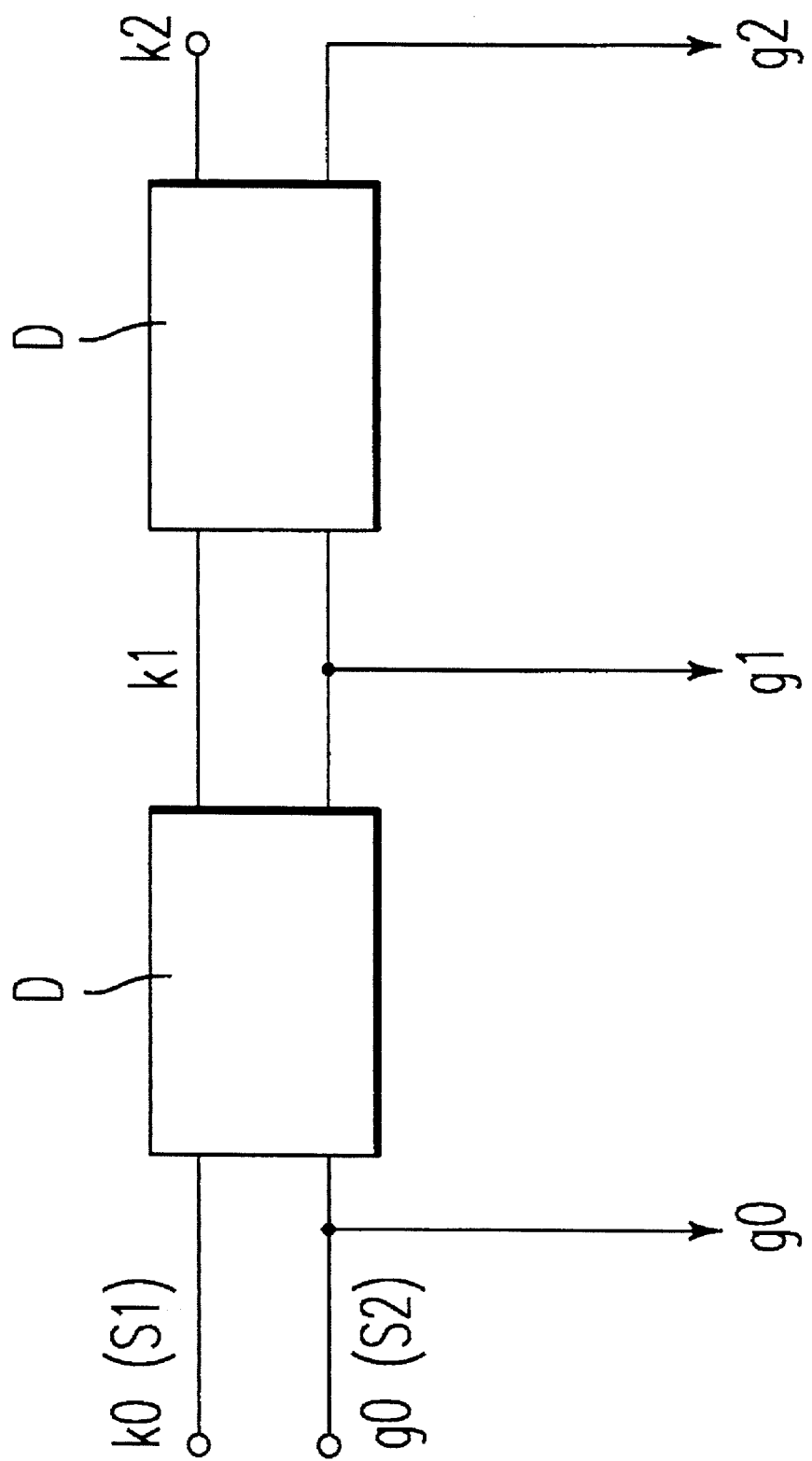
FIG. 7 represents a forward/backward counter providing a partial address expressed in the Gray code and used in a device according to the invention.

FIG. 7 represents the block diagram of a forward/backward counter according to the invention mentioned above. It was stated earlier that the forward/backward counters according to the prior art must comprise an output register controlled in synchronism with the signals leaving the position coder. The invention does not have this disadvantage since the binary code used changes by one bit only from one combination to the next. Indeed, according to the invention, the absolute position of the motor shaft is coded according to the reflected binary code or according to any other equivalent code. This therefore makes it possible not only to do away with the output register, but also to take into account at each moment the output signal from the forward/backward counter without having to wait for a time window.

As a reminder, the table below recalls the progression of the reflected binary code or Gray code when the latter is defined, for example, on three bits b2, b1, b0:

| b2 | b1 | b0 |
|----|----|----|
| 0  | 0  | 0  |
| 0  | 0  | 1  |
| 0  | 1  | 1  |
| 0  | 1  | 0  |
| 1  | 1  | 0  |
| 1  | 1  | 1  |
| 1  | 0  | 1  |
| 1  | 0  | 0  |

It is seen that this code follows a progression such that there is a change of one bit only from one combination to the next.

The forward/backward counter of FIG. 7 provides, according to a preferred embodiment of the invention mentioned above, a partial address with 3 bits: g2, g1, g0, since, as will be seen later, it is not necessary to transmit the whole absolute address but only its lowest order bits.

The two signals S1 and S2 leaving the position coder are here denoted k0 for S1 and g0 for S2.

A device D receives the two signals k0 and g0 and delivers the signals k1 and g1. Similarly, a second device D receives the two signals k1 and g1 and delivers the signals k2 and g2 (k2 is not used).

The circuits contained in the devices D are logic circuits combined in such a way that the various signals gi and ki (i=0, 1, 2) are related as follows:

$$gi = \bar{g}(i-1) \cdot gi + g(i-1) \cdot (k(i-1) \oplus ki)$$

$$ki = g(i-1) \cdot ki + \bar{g}(i-1) \cdot (k(i-1) \oplus gi)$$

In the above expressions $\bar{g}i$ represents the logical complement of $gi$. The various operations represented symbolically by the signs "·", "+", and "⊕" are the functions known to those skilled in the art by the respective names "and", "or" and "exclusive or".

According to the embodiment described, the two devices D enable a partial address with 3 bits to be generated. Generally B−1 devices D enable a partial address with B bits to be generated.

According to the invention mentioned above, it is not necessary for the forward/backward counter to generate an absolute address in order to create the indication giving the position of the motor shaft. A partial address is sufficient on condition that the absolute address is reconstructed.

Figure 8A:
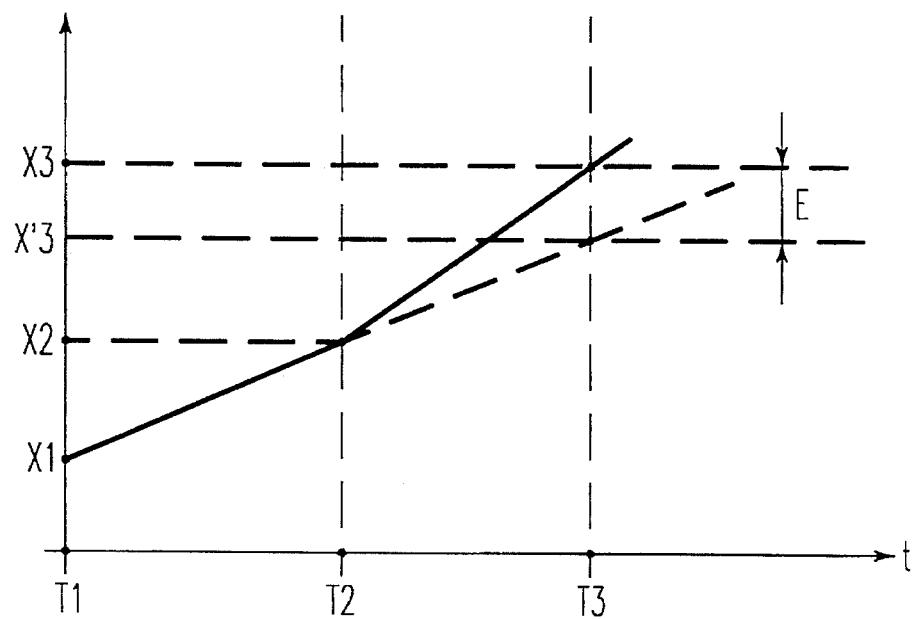
FIG. 8A represents the curve for determining the absolute addresses by linear extrapolation, in the case where the forward/backward counter of FIG. 7 provides merely a partial address.

FIG. 8A represents the computational principle of an algorithm enabling the absolute address to be reconstructed by linear extrapolation. This algorithm is the simplest one demonstrating the feasibility of restoring the absolute address from its lowest order bits. The principle thereof is based on the fact that if the remainder from the division modulo Q of a quantity X is known at every moment, and if the first two absolute addresses X1 and X2 are known, the succeeding absolute addresses can be deduced therefrom. Q represents the quantization of the partial address: for 3 bits $Q=2^3=8$.

In the curve of FIG. 8A, the address Xj (j=1, 2, 3) is the absolute address which must be provided at time Tj.

The times T1, T2, T3 are such that $$T3-T2=T2-T1=T.$$

X'3 is the linear extrapolation of X1 and X2.
It follows therefore that:

$$X'3-X2=X2-X1.$$

i.e.:

$$X'3=2X2-X1.$$

The error E corresponding to the discrepancy between the address X3 to be provided and the address X'3 obtained by linear extrapolation is:

$$E=X3-X'3$$

i.e.:

$$E=X3-2X2+X1$$

If E is less than Q/2, then:

$$E=(X3 \bmod Q-2X2+X1) \bmod Q$$

i.e.:

$$E = (x3 - 2X2 + X1) \mod Q$$

with x3=X3 mod Q, x3 representing the measure of the lowest order bits.

γmax being the maximum acceleration of the quantity X, the maximum error E max which may be obtained is:

E max=γmax×T². We must therefore have Q>2×γmax×T².

In this case, the address X3 provided can therefore be written:

$$X3 = 2X2 - X1 + (x3 - 2X2 + X1) \mod Q.$$

The computations described above are carried out with the aid of a microprocessor. According to the chosen preferred embodiment, these computations are performed by the microprocessor computing the position error of the motor shaft to be controlled.

In addition to the function for extrapolating and reconstructing the absolute address, the algorithm according to the invention enables the likelihood of the data to be monitored. The error E is then compared with a likelihood value EV. The value EV is chosen so as to be small compared with E max. If the error E is less than or equal to EV, the algorithm continues without diversion. Otherwise, the value of the error E is set to zero, thus allowing elimination of the outlying samples.

Figure 8B:
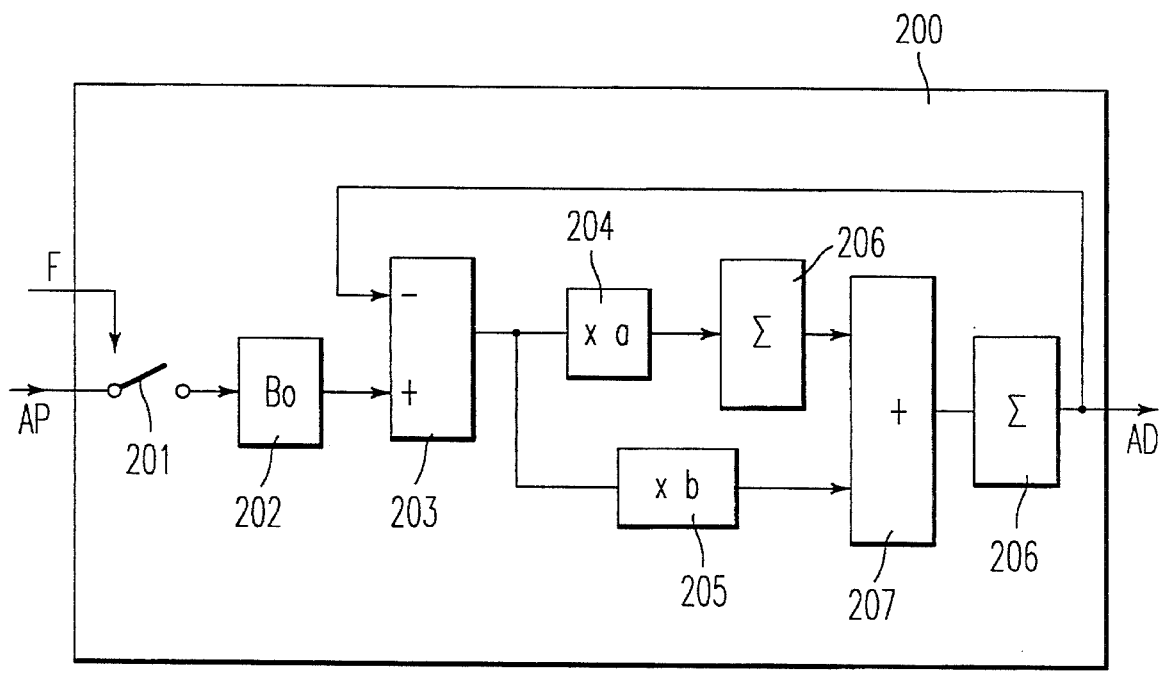
FIG. 8B represents, symbolically, an algorithm for determining the absolute address in the case where the forward/backward counter of FIG. 7 provides merely a partial address.

FIG. 8B represents, symbolically, another algorithm allowing reconstruction of the absolute address. This algorithm is represented symbolically by the device 200. Inside this symbolic device, each mathematical operation is represented by an elementary symbolic device. Each of these elementary operations is known to those skilled in the art. They are merely recalled in order to undertake a complete description of the algorithm.

The partial address AP, consisting of the lowest order bits of the absolute address, is sent to the symbolic device 200 and the absolute address AD is recovered at the output of the said device. The various elementary symbolic devices (201, 202, 203, 204, 205, 206, 207) are combined in such a way that the addresses AP and AD are related as follows:

$$\frac{AD}{AP} = \frac{b \times \Sigma + a \times \Sigma^2}{1 + b \times \Sigma + a \times \Sigma^2}$$

with $$\Sigma = \frac{1}{1 - z^{-1}}$$

and, as is known by those skilled in the art, $z = e^{i\omega T}$ ω being the pulsatance in the Fourier analysis sense, of the signal associated with the partial address AP and T=1/F, F being the frequency for sampling the signal associated with the partial address AP, the said sampling being symbolized by the switch 201 and retention of the value of the sample being ensured until the arrival of the succeeding sample by the device 202.

This algorithm allows modelling and identification of the speed by exponential averaging. It should be noted that it lessens the effect of the error-affected samples with the aid of the filtering which it performs on the said samples.

The multiplier 204, with multiplicative factor a, determines the low-pass filter for the absolute address AD, whilst the multiplier 205, with multiplicative factor b, gives the time constant of the low-pass filter for the speed.

The devices 206 symbolize the operation $$\Sigma = \frac{1}{1 - z^{-1}}$$

that is to say the adding of the value of each new sample, present at the input of the device, to the value which its output had at the instant of arrival of this sample.

Finally, the device 203 symbolizes the differencing carried out between the signals originating from the second device 206 and from the device 202 respectively, whilst the device 207 symbolizes the summation carried out on the two signals originating from the device 202 and from the first device 206 respectively.

According to the preferred embodiment of the invention mentioned above, a complete absolute address with N bits is reconstructed from a partial address with 3 bits leaving the forward/backward counter. The indication given by a partial address with 2 bits is insufficient since the ambiguity in the position of the motor shaft might not be resolved for certain particular values of the speed. For greater safety, in particular when substantial noise is present in the motor shaft position signal, there may be a need to increase the redundancy of the partial address by increasing its number of bits, for example by raising to 4 bits or more. However, 3 bits are generally sufficient, in the absence of substantial noise, to reconstruct any complete absolute address with a minimum of redundancy.

Whatever the algorithm for reconstructing the absolute address, initialization of the absolute addresses is done with the aid of an external sensor. It is done, as is known to those skilled in the art, with the aid of a known position stop, the said position being read off at zero speed.

Figure 9:
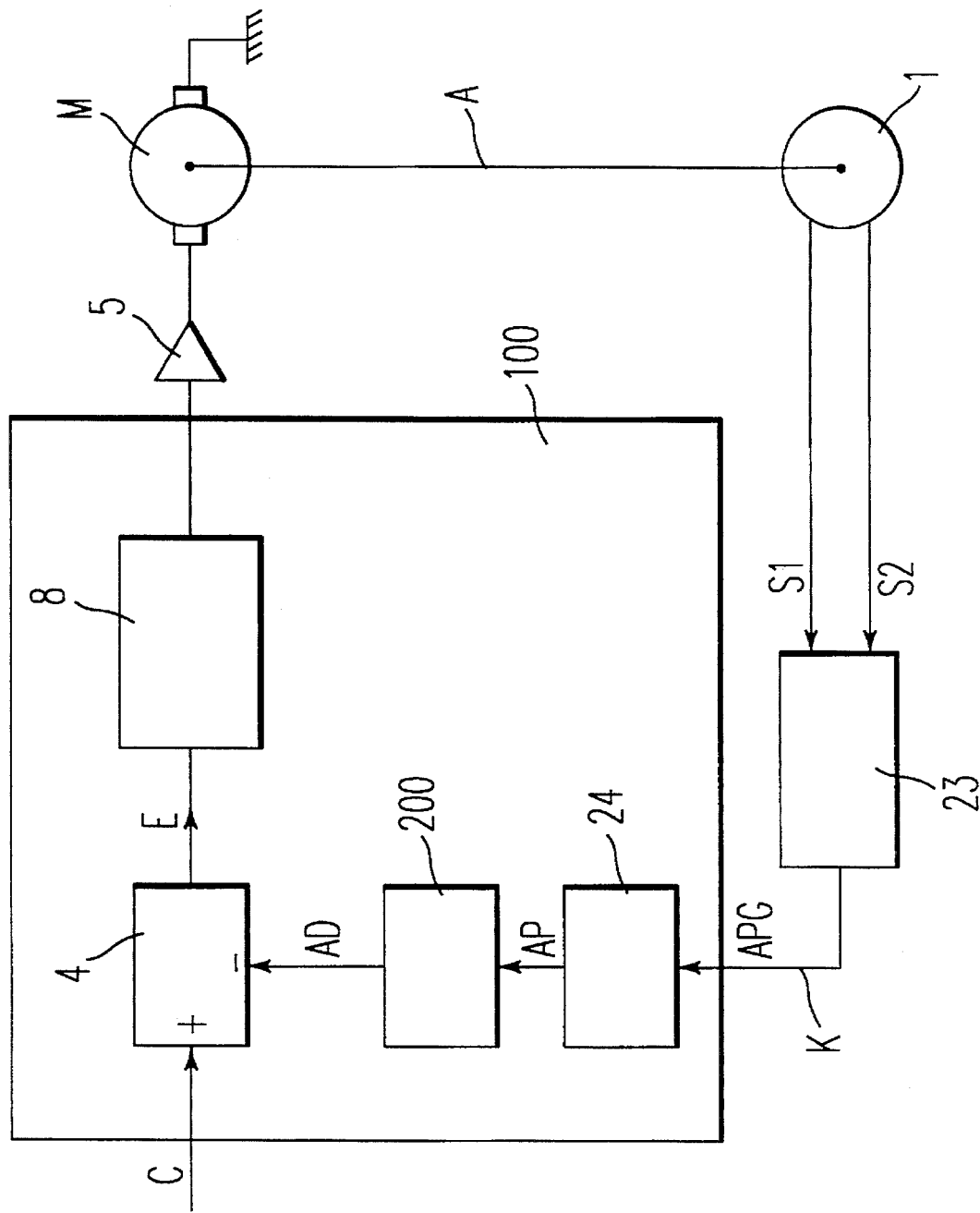
FIG. 9 represents the block diagram of a device according to the invention in the case where it contains a forward/backward counter of the type described in FIG. 7.

FIG. 9 represents the block diagram of a position servo-control using a forward/backward counter device according to the preferred embodiment of the invention mentioned above.

The coder 1 captures the position of the motor shaft A and delivers the two signals S1 and S2 in quadrature. The indication leaving the forward/backward counter 23 is coded with the Gray code with the aid, for example, of 3 bits.

Under these conditions, the wiring element K consists of 3 wires linked to the microprocessor 100. It was stated earlier that 3 bits enable an absolute address with N bits to be reconstructed. According to the preferred embodiment of the invention N=24. It is therefore an advantage of the invention mentioned above that it is possible to transmit in one single operation and at any time the indication allowing reconstruction of the absolute address with the aid, for example, of 3 wires instead of 24.

The wiring element K sends the partial address coded with the Gray code APG, consisting preferably of the three bits g0, g1, g2, to the device 24, which converts the said partial address into a partial address expressed in binary AP. The device 24 is known to those skilled in the art and is therefore not described.

The reconstruction algorithm 200 then makes it possible to generate the absolute position address which, when compared with the set-point C, gives the position discrepancy E.

The devices, 8 according to the invention, and 5 are the same as those described in connection with the preceding FIGS.

In the algorithms described earlier for absolute address extrapolation and reconstruction, the speed is computed either over the two known samples immediately preceding the new sample whose address it is wished to extrapolate as described with reference to FIG. 8A, or from all the preceding samples with an exponential type averaging as used in extrapolating the address described with reference to FIG. 8B. The speed can also be computed from the sample immediately preceding the new sample, whose address it is wished to extrapolate, and from a much older sample so as to make the inaccuracy in the speed less sensitive to the inaccuracy in the address of the two samples serving to determine it. Any other method combining the addresses of older samples with the address of the latest known sample in order to obtain a value of the speed can be used in the device according to the invention. It should also be noted that the accuracy with which the said speed is known is more important than the equality of the said speed and the actual speed of the object at the time when it is computed, it always being possible for the systematic error introduced into the said speed to be evaluated, bounded above and taken into account within the limits of operation of the algorithm.

Taking up again the equations written in the case of the simplest linear extrapolation described with reference to FIG. 8A, it follows, on introducing the speed V, that:

$$X3 = X2 + V \times T$$

$$E = X3 - X2 - V \times T$$

The absolute uncertainty in the error E, which is denoted $\Delta E$, is:

$$\Delta E = \Delta X_3 + \Delta X_2 + \Delta(V \times T)$$

The values of X being quantized, the errors in X3 and X2 are therefore equal to a quantization increment which is taken as unity, i.e.:

$$\Delta X_3 = \Delta X_2 = 1$$

In order to restore the address X3 without ambiguity, we must have:

$$Q > 2(E\ max + \Delta E),$$

i.e.

$$Q > 2(\gamma max \times T^2 + \Delta X_3 + \Delta X_2 + \Delta(V \times T))$$

$$\Delta(V \times T) = V \times \Delta T + T \times \Delta V \cong T \times \Delta V)$$

since the sampling period is very accurate: it is provided by the clock for time referencing the whole device, which can be a quartz clock.

It therefore follows that:

$$Q > 2(\Delta X_{3i\ +\Delta X2}) + (\gamma max \times T^2 + T \times \Delta V).$$

With the maximum values of $\Delta X_2$ and $\Delta X_3$, it follows that:

$$Q > 4 + 2(\gamma max \times T^2 + T \times \Delta V)$$

With a speed computed in such a way as to limit its inaccuracy arising from the inaccuracy in the preceding absolute addresses, and with an acceleration which remains small or with a sampling at high frequency, hence with T small, the term $2(\gamma max \times T^2 + T \times \Delta V)$ can be kept much less than 1, so that in order to be able to extrapolate the address X3 without ambiguity it is sufficient to take $Q \geq 5$. Instead of using a binary counter it is then possible to use a cyclic so-called ring counter. The smallest usable value being Q=5, a five-state cyclic counter can be used.

FIG. 10A represents the chart of the internal states as well as the operating table of a five-state forward/backward counter. The occurrence of an edge of one of the two signals S1 or S2 coming from the coder causes, depending on the state of the other signal, movement of the internal state of the said coder/decoder in the positive direction or in the negative direction as is apparent in the said operating table.

FIG. 10B represents, for two signals S1 and S2 coming from the coder (1) entering the forward/backward counter 25, the corresponding internal state EI of the said forward/backward counter and the output signals in the case where a wiring element K with five conductors C0, C1, C2, C3 and C4 is used to transmit the five elementary positions of the partial address to the microprocessor. This choice is appropriate when both speed and accuracy are desired in the positioning of an object: for example a fast-moving motor shaft fitted with a coder whose graduation shows a large number of marks per revolution. The duration of transmission of the partial address to the microprocessor managing the position of the motor shaft is then minimized. The five signals s0, s1, s2, s3 and s4 carried by the conductors C0, C1, C2, C3 and C4 respectively each represent the state of the counter 25 bearing the same reference (0, 1, 2, 3, 4). In order to have the option, as in the case of the Gray code, of being able to sample the address coming from the forward/backward counter at any time, the signals si (i=0, 1, 2, 3, 4) are prolonged slightly beyond the time of change of state of the forward/backward counter so as to never have a 0 level on the five conductors simultaneously; it may be judicious, when two signals si are present simultaneously at the 1 level, to choose the one which corresponds to the first state encountered in the positive direction of the changes of state of the forward/backward counter. Thus 0 takes precedence over 1, 1 over 2, 2 over 3, 3 over 4 and 4 over 0. Under these conditions, as in the case of the Gray code, the error is at most one quantization increment of the coder.

Figure 11:
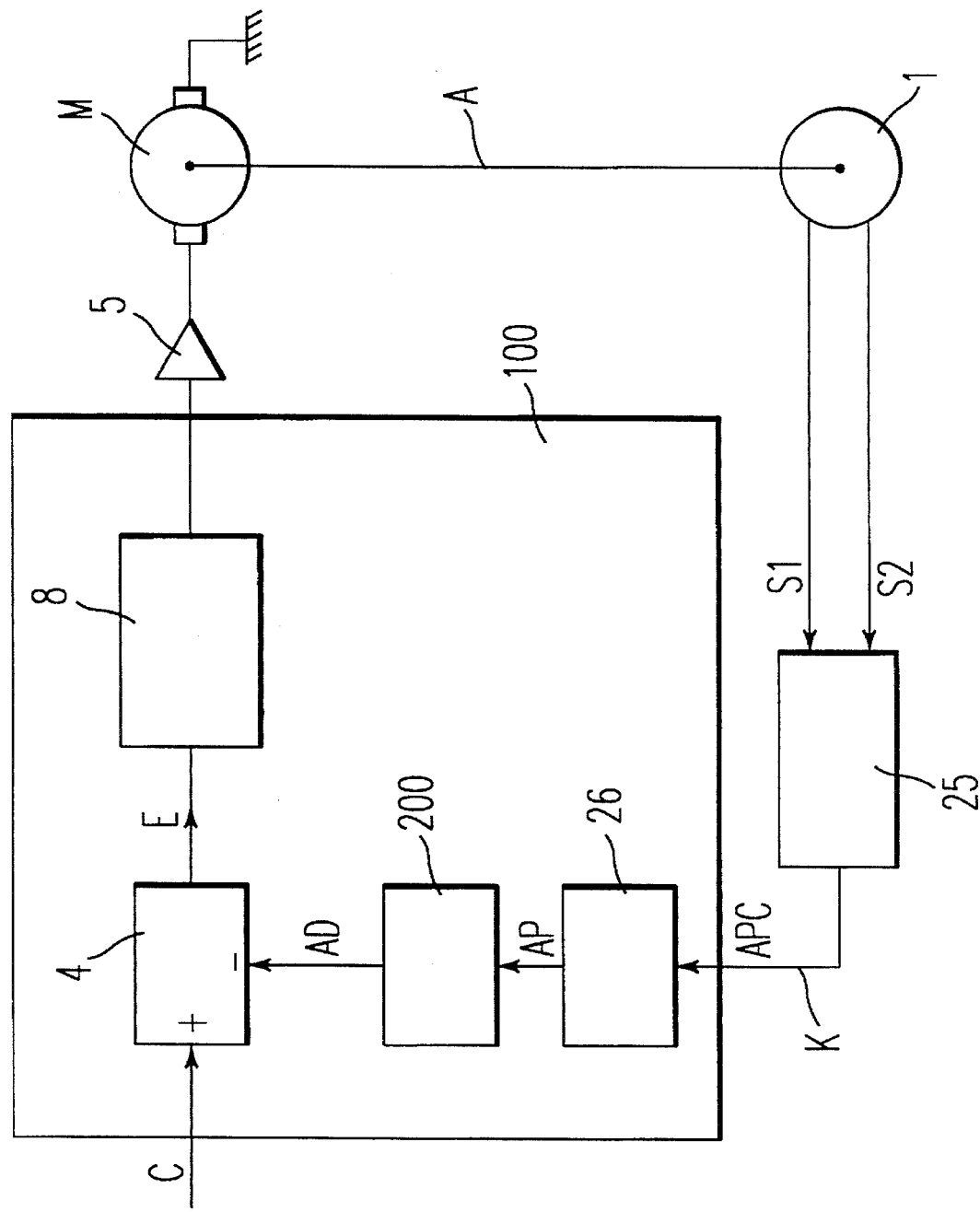
FIG. 11 represents a device according to the invention using a five-state cyclic counter.

FIG. 11 represents the block diagram of a position servocontrol using a forward/backward counter device according to a second embodiment of the invention mentioned above. This device differs from the previous one only by the forward/backward counter. A cyclic forward/backward counter 25 of the same type as that described earlier (cf. FIGS. 10A and 10B) is used. A device 26 enables the partial address APC generated by the forward/backward counter to be converted into a partial address AP expressed in binary code. This device is known to those skilled in the art and it is unproductive to describe it in the present patent application. The remainder of the description is identical to what was described in FIG. 9.

Instead of performing a conversion of the partial address APC into a binary partial address AP, it is possible for those skilled in the art to devise a computation by the microprocessor for converting the address APC into a binary absolute address AD directly. This then makes it possible to take maximum advantage of the simultaneity of the accuracy and of the speed of servocontrol of the motor shaft.

I claim:

1. A control device for servocontrolling an object to a given position, comprising:

a motor;

a coder connected to said motor; and a rig connected to said coder and said motor, said rig comprising:

(a) a counter and a subtractor which generate a position discrepancy signal on the basis of an output of said coder and an external set-point signal input to said subtractor;

(b) a plurality of circuit paths each having a sampling device which receives said position discrepancy signal and samples this signal at a distinct frequency, each circuit path performing a different degree of differentiation;

(c) a summing unit for receiving and summing outputs of each of said circuit paths; and (d) an amplifier for receiving an output of said summing unit and outputting a control signal which controls said motor.

2. A control device according to claim 1, wherein a first of said circuit paths differentiates said position discrepancy signal, and a second of said circuit paths outputs a position signal on the basis of said position discrepancy signal.

3. A control device according to claim 2, wherein said position discrepancy signal is sampled along said first circuit path at a frequency F, the sampled signal is differentiated and multiplied by factor R, R being an integer greater than 1, and wherein said position discrepancy signal is sampled along said second circuit path at a frequency F1=F/R.

4. A control device according to claim 3, wherein said second circuit path comprises a symbolic device which receives the sampled position discrepancy signal and applies the following operation to compute said position signal:

$$f(U) = \frac{U}{|U|} \sqrt{2UMX \times \left(U - \frac{UMX}{2}\right)} \times \frac{U}{|U|}$$

where U represents the sampled position discrepancy signal sampled at the frequency F1, and UMX represents a positive real number chosen as a function of characteristics of the motor.

5. A control device according to claim 4, wherein said counter provides a binary-coded absolute address in accordance with an indication of the position of said object, and said subtractor compares said absolute address with said external set-point signal.

6. A control device according to claim 5, wherein operations of said subtractor, said circuit paths, and said summing unit are controlled via a microprocessor.

7. A control device according to claim 4, wherein said counter generates a non-binary coded first partial address limited to the lowest order bits of an absolute address, and wherein a microprocessor controls a transformation of said first partial address into said absolute address.

8. A control device according to claim 7, wherein operations of said subtractor, said circuit paths, and said summing unit are controlled via said microprocessor.

9. A control device according to claim 8, wherein said microprocessor converts said first partial address into a binary-coded second partial address and reconstructs said absolute address from said second partial address via a reconstruction algorithm.

10. A control device according to claim 9, wherein said counter comprises n sub-assemblies, n being an integer, each sub-assembly generating two signals on the basis of an output of an immediately proceeding sub-assembly, a first signal representing a bit of said first partial address expressed in reflected binary code, a first of said n sub-assemblies directly receiving signals output from said coder.

11. A control device according to claim 9, wherein said counter comprises a cyclic counter having at least 5 states.

12. A control device according to claim 11, wherein said reconstruction algorithm for reconstructing said absolute address is a linear extrapolation algorithm.

13. A control device according to claim 12, wherein said reconstruction algorithm comprises an algorithm for monitoring likelihood of the raw data representing a measure of the lowest order bits of said absolute address.

14. A control device according to claim 9, wherein said reconstruction algorithm for reconstructing said absolute address (AD) from said partial address (AP) is an algorithm for modeling and identifying the speed of said object by exponential averaging such that:

$$\frac{AD}{AP} = \frac{b \times \Sigma + a \times \Sigma^2}{1 + b \times \Sigma + a \times \Sigma^2}$$

with $$\Sigma = \frac{1}{1 - z^{-1}}$$

and $z = e^{i\omega T}$, $\omega$ being the pulsatance, in the Fourier analysis sense, of the signal associated with the partial address AP, T=1/F, F being the frequency for sampling the signal associated with the partial address AP, and a, b being multiplicative factors.

15. A control device according to claim 4, wherein f(u) is computed in accordance with a table of values providing a finite numbers of values of a number, $\sqrt{r}$, where $1 \leq r \leq 4$.

16. A control device according to claim 15, wherein R is chosen such that a phase of the signal output from said summing unit is 50° to 65° ahead of a phase of said position discrepancy signal.

17. A control device according to claim 16, wherein R=8.

18. A control device according to claim 17, including a circuit path for integrating each position discrepancy signal.

19. A control device according to claim 18, wherein each position discrepancy signal is sampled at a sampling frequency $F2=F/R^2$ when the speed of a corresponding object is less than a predetermined value, prior to being integrated.

20. A control device for servocontrolling the positions of a plurality of objects to given positions, comprising:

a plurality of forward/backward counters each generating a binary-coded absolute address in accordance with a position of an object associated therewith;

a microprocessor for generating a position discrepancy signal for each of said plurality of objects in accordance with a servocontrol algorithm which compares each absolute address with external, set-point signals representing said given positions of said objects, and for (a) sampling each position discrepancy signal at a sampling frequency F, differentiating the sampled position discrepancy signals, and multiplying the differentiated sampled position discrepancy signals by a factor R, R being an integer greater than 1, (b) integrating said position discrepancy signals, (c) sampling said position discrepancy signals at a sampling frequency F1=F/R and computing a position signal for each of said objects; and a summing unit for receiving and summing outputs of operations (a) (b) (c) of said microprocessor and outputting a signal for controlling the positions of said objects.

21. A control device for servocontrolling a plurality of objects to given positions, comprising:

a plurality of forward/backward counters each generating a non-binary coded partial address limited to the lowest order bits of an absolute address, in accordance with a position of an object associated therewith;

a microprocessor which transforms each partial address into an absolute address, and generates a position discrepancy signal for each of said plurality of objects in accordance with a servocontrol algorithm which compares each absolute address with external, set-point signals representing said given positions of said objects, and which (a) samples each position discrepancy signal at a sampling frequency F, differentiates the sampled position discrepancy signals, and multiplies the differentiated sampled position discrepancy signals by a factor R, R being an integer greater than 1, (b) integrates said position discrepancy signals, and (c) samples said position discrepancy signals at a sampling frequency F1=F/R and computes a position signal for each of said plurality of objects; and a summing unit for receiving and summing outputs of operations (a), (b), and (c) of said microprocessor and outputting a signal for controlling the positions of said objects.

22. A control device according to any of claims 20–21, wherein said position signal is computed as follows:

$$f(u) = \frac{U}{|U|} \sqrt{2UMX \times \left( U - \frac{UMX}{2} \right) \times \frac{U}{|U|}},$$

where U represents the sample position discrepancy signal sampled at the frequency F1, and UMX represents a positive real number chosen as a function of characteristics of a motor which moves said objects.

23. A control device according to claim 22, wherein f(u) is computed in accordance with a table of values providing a finite number of values of a number $\sqrt{r}$, where $1 \leq r \leq 4$.

24. A control device according to claim 23, wherein R is chosen such that a phase of the signal output from said summing unit is 50° to 65° ahead of a phase of said position discrepancy signal.

25. A control device according to claim 24, wherein R=8.

26. A control device according to claim 25, including a circuit path for integrating each position discrepancy signal.

27. A control device according to claim 26, wherein each position discrepancy signal is sampled at a sampling frequency $F2=F/R^2$ when the speed of a corresponding object is less than a predetermined value, prior to being integrated.

* * * * *